US005442465A

United States Patent [19]
Compton

[11] Patent Number: 5,442,465
[45] Date of Patent: Aug. 15, 1995

[54] APPARATUS AND METHOD FOR CONTROLLING A LINEAR IMAGING DEVICE

[75] Inventor: John T. Compton, LeRoy, N.Y.

[73] Assignee: Eastman Kodak Company, Rochester, N.Y.

[21] Appl. No.: 298,725

[22] Filed: Aug. 31, 1994

[51] Int. Cl.6 .................. H04N 1/03; H04N 1/191
[52] U.S. Cl. .................. 358/482; 358/483; 358/494; 250/208.1; 348/294; 348/295; 348/297; 348/298; 348/324
[58] Field of Search ............. 358/483, 482, 494, 471, 358/443, 445, 444, 447, 513, 514; 250/208.1; 348/294, 295, 297, 298, 324

[56] References Cited

U.S. PATENT DOCUMENTS

| | | | |
|---|---|---|---|
| 4,969,053 | 11/1990 | Outa et al. | 358/471 |
| 5,029,019 | 7/1991 | Yoshihare et al. | 358/447 |
| 5,113,454 | 5/1992 | Marcantonio et al. | |
| 5,130,819 | 7/1992 | Ohta | 358/445 |
| 5,191,443 | 3/1993 | Nagaoka | 358/444 |
| 5,239,388 | 8/1993 | Matsumoto | 358/444 |

Primary Examiner—Scott A. Rogers
Attorney, Agent, or Firm—Francis H. Boos

[57] ABSTRACT

A CCD linear imager is dynamically controlled on a pixel-by-pixel basis by a line-related map of control words stored in memory with individual control words addressed by a pixel counter operating in synchronism with processing of each imaging pixel in the CCD. Multiple control word maps may be stored in memory for programmed selection "on the fly" to vary the operating control of the CCD on a line-by-line basis.

6 Claims, 2 Drawing Sheets

APPARATUS AND METHOD FOR CONTROLLING A LINEAR IMAGING DEVICE

FIELD OF THE INVENTION

The invention relates generally to the field of film scanners and, in particular, to apparatus and method for controlling the operation of linear imaging devices in such scanners.

BACKGROUND OF THE INVENTION

Modern film scanners typically employ a linear imaging device such as a charge-coupled-device (CCD) for scanning film images to generate digital signals representative of the image information. A linear charge coupled device (CCD) imager contains a linear array of light detecting sites (hereafter "imaging pixels") which accumulate charge depending on the light energy projected onto them. After some charge accumulation time, the charges in the light detecting imaging pixels are transferred to a charge shifting structure so that the charges may be shifted out of the CCD and measured by some means in order to form a representation of the image projected onto the CCD. There are a number of signals which control the operation of the imager: clock signals which cause the charge to be shifted out of the imager, a transfer signal which causes the charge from the imaging pixels to be transferred to the shift structure, and one or more signals which electronically control exposure.

Typically, the control signals for the imager will be generated by a programmable logic device (PLD) or an application specific integrated circuit (ASIC). A counter circuit with a decoder is used to indicate when the charge clocking and transfer signals should be operated during the scan line. A counter with a reload value is used for each exposure control. These structures consume significant resources within a PLD or ASIC. Additionally, since they are embedded in the PLD program or the design of the ASIC, the structures are either inflexible or flexibility is gained at the cost of increased complexity and more resources.

If it is desired to make a change in the timing of control signals to a CCD imager, and the timing is embedded in the design of a PLD or ASIC, then the PLD or ASIC component must be physically removed from the system and replaced with an updated component. If this change is required as a field upgrade, the costs to upgrade will be significant. Additionally, if the component is an ASIC, significant costs may be incurred in modifying the design. There is therefore a need for an alternative, less costly and more flexible manner of controlling linear imaging devices when the control events occur during a line and this invention satisfies this need.

SUMMARY OF THE INVENTION

In accordance with the invention, therefore, there is provided apparatus for controlling operation of a linear imaging device having a line of light-responsive imaging pixels, wherein the apparatus comprises pixel counter means for supplying pixel counts corresponding to individual pixels in the imaging device; and means for supplying a map of operating control words, the control words each comprising programmably variable bit content defining pixel-by-pixel operating characteristics of the line of imaging pixels. The apparatus further includes memory means for storing the map of control words at memory addresses corresponding to the pixel counts; and means for outputting the control words from the memory to the imaging device in synchronism with the pixel counts to control the operation of the imaging device on a pixel-by-pixel basis in accordance with the bit content of each control word.

The method of the invention comprises providing a map of operating control words each of which comprises programmably variable bit content defining pixel-by-pixel operating characteristics of a line of imaging pixels in a linear imaging device; storing the control words in imaging pixel related address locations in a memory and accessing said control words from the memory on a pixel-by-pixel basis and using the accessed control words to control operation of the imaging device on a pixel-by-pixel basis.

It will be appreciated that, by utilizing a list of control words in a memory for pixel-by-pixel control of the operation of a linear imaging device, flexibility is gained and PLD or ASIC resources and size are reduced at the same time.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
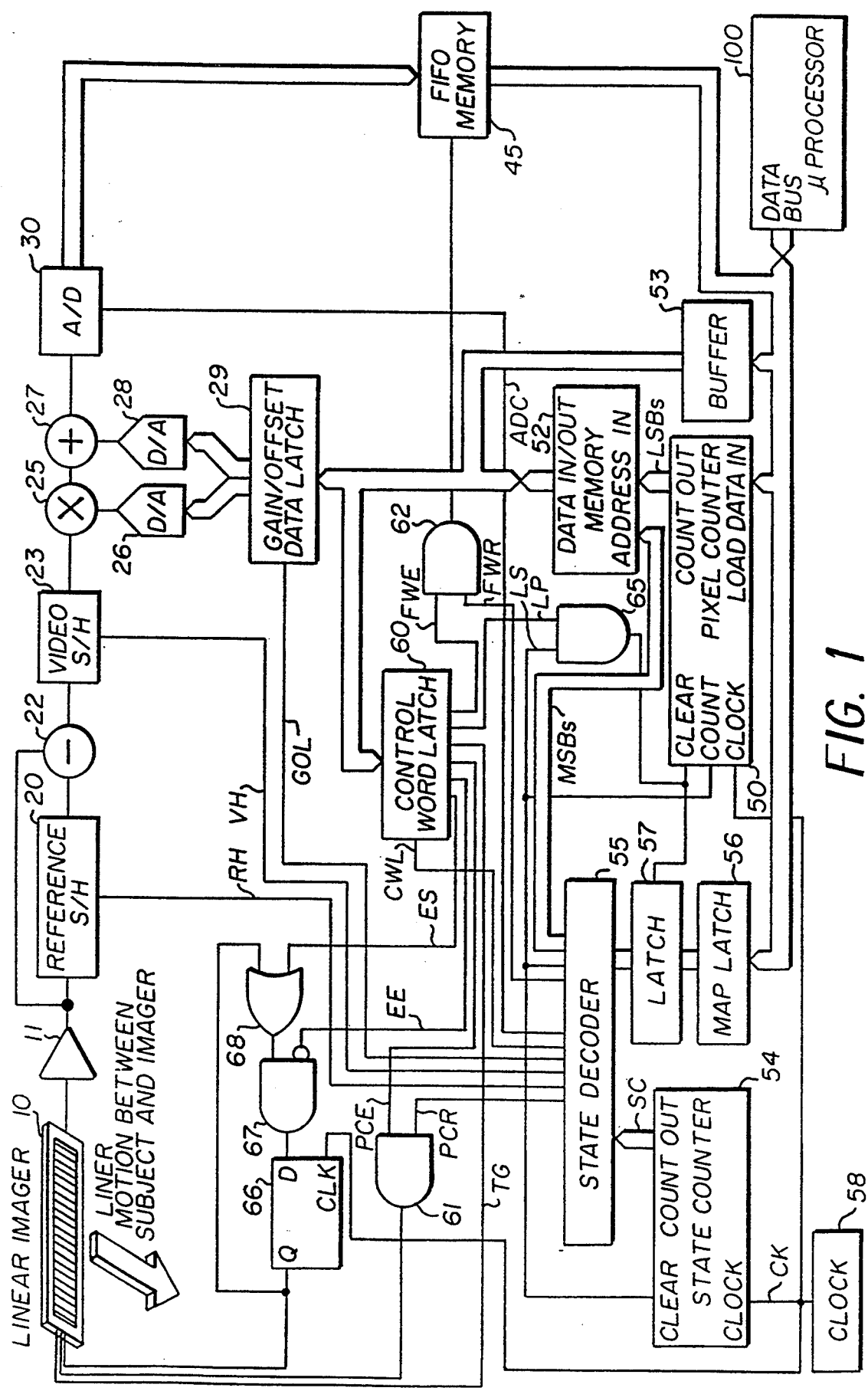
FIG. 1 is a block diagram of a film scanner system including imaging device control apparatus of the present invention.

FIG. 1 shows an arrangement of circuit elements in the signal processing circuitry of a CCD based linear scanner. A linear CCD imaging device 10 integrates the charges produced by each imaging pixel in the CCD for a period of time and then transfers the charges to a shifting structure so that the charges can be shifted out of the CCD in a serial fashion. The signal produced by the CCD for each imaging pixel comprises two phases: a reference phase followed by a video phase. The reference phase provides a reference level against which the video phase that follows may be compared. The video phase represents the magnitude of charge accumulated at the imaging pixel. The serial signal coming from the CCD 10 is amplified by amplifier 11, the output of which goes to a subtracter circuit 22 and a reference sample-and-hold circuit 20. The reference sample-and-hold 20 samples the signal from the CCD during each image pixel's reference phase. The subtracter 22 removes the sampled and held reference signal from the subsequent video phase. Hence, the output of the subtracter 22 is normalized to the reference level. This normalized signal is sampled by a video sample-and-hold circuit 23 during the video phase of the signal provided by the imager.

The sampled-and-held normalized video signal at the output of video S/H 23 is operated on by a multiplier circuit 25 and a summer circuit 27. These two circuits provide gain and offset compensation for variations in the video signal caused by such factors as variations in imaging pixel sensitivity, non uniformity of illumination, variations in signal offset and the like. The digital-to-analog converter 26 provides the gain correction value for multiplier 25 and the digital-to-analog converter 28 provides the offset correction value for summer 27. Data representing the offset and gain compensation values are provided to the two analog-to-digital converters 25 and 27 on a pixel-by-pixel basis with the arrival of the normalized video signal for each imaging pixel of CCD 10 by means of pixel counter 50, RAM memory 52, and gain/offset data latch 29. The pixel counter 50 increments synchronously with readout of the imaging pixel signals from the CCD 10. The output of pixel counter 50 is used to provide an address to memory 52 which holds gain and offset values for each imaging pixel. The gain and offset data output from the memory is latched by data latch 29 which provides the data to digital-to-analog (D/A) converters 26 and 28. A buffer circuit 53 allows a microprocessor 100 to gain access to memory 52 in order to change the gain and offset values as the result of a calibration process. The output of summer circuit 27 is coupled to analog-to-digital converter 30 wherein the normalized and gain/offset-corrected video signal is converted to a numeric value which is then written to the FIFO memory 45 for readout and subsequent utilization by microprocessor 100. The single CCD output and related signal processing circuits as just described would provide a monochrome video signal. For a three color video signal, the CCD 10 would comprise three in-line CCD's each provided with a separate color filter, such as red, green and blue, and the outputs of each linear CCD would be coupled to separate processing circuits.

Figure 2:
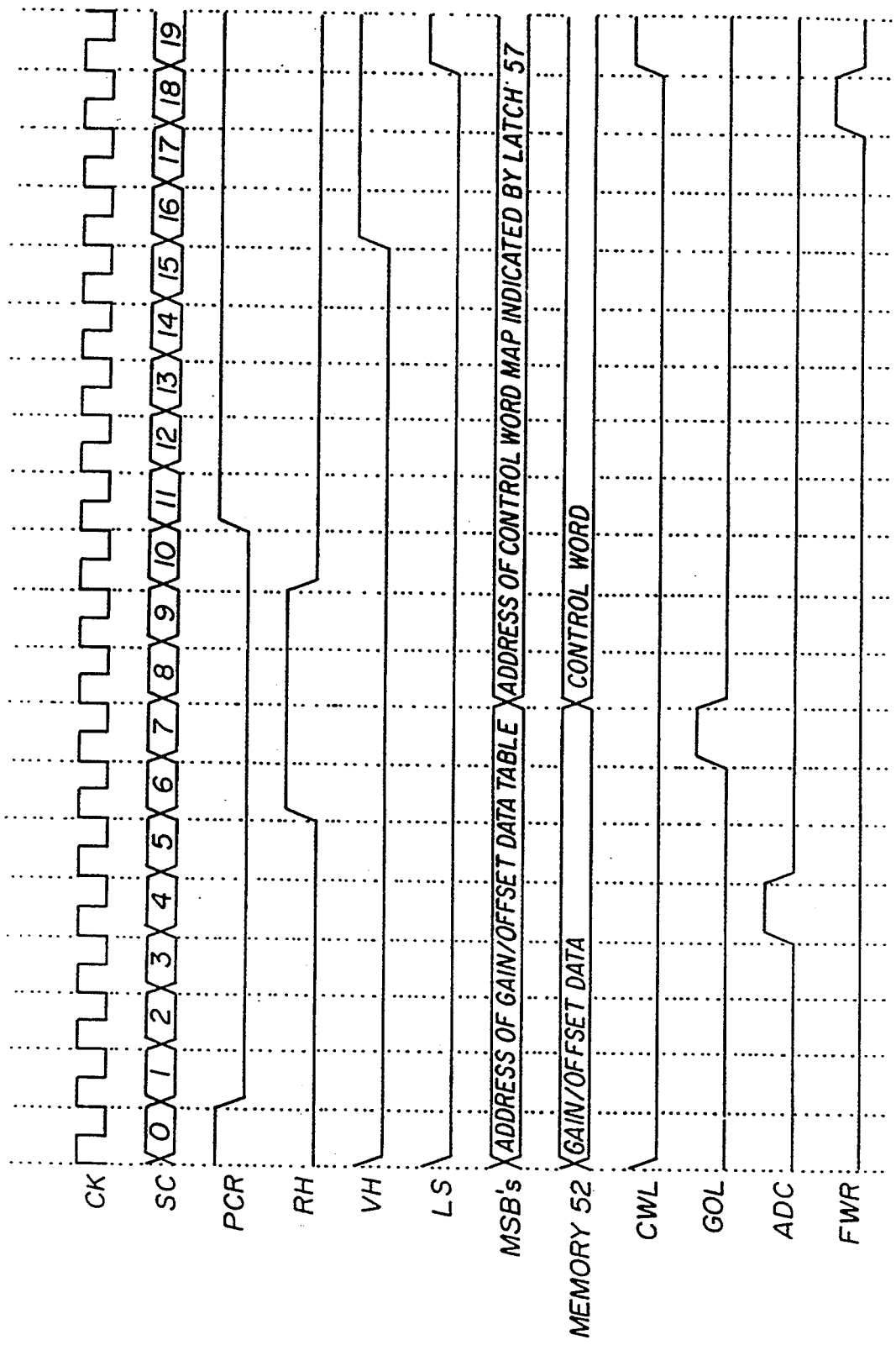
FIG. 2 is a timing diagram useful in explaining the operation of the system of FIG. 1.

Timing of the various CCD and signal processing functions is determined by state control signals provided from state decoder 55. These state control signals are illustrated in FIG. 2 showing a sequence of twenty operating states occurring during the processing of each imaging pixel in CCD 10. Referring jointly to FIGS. 1 and 2, a clock signal CK from clock generator 58 causes state counter 54 to produce a sequential count data signal SC applied to the input of state decoder 55 which operates to decode the state count SC to produce the state control signals. The phase control raw (PCR) signal is applied to AND circuit 61 during states 11 through 0 (next sequence) to perform transfer of the image pixel signal out of the CCD. Actual timing of the phase control signal operation is determined by the phase enable (PE) signal from a control word latch 60 as will be described in more detail subsequently. The reference sample-and-hold operation is performed by the RH state signal during states 6–9 and the video sample-and-hold is performed by the VH state signal during states 16–19. The GOL state signal causes latching of the gain and offset data from memory 52 into data latch 29 during state 7. State control signal ADC enables analog-to-digital converter 30 to convert the analog image pixel signal during state 4 and the FIFO write raw (FWR) state control signal is applied to AND circuit 62 to allow writing of pixel data into FIFO memory 45 when enabled by a FIFO write enable (FWE) signal from control word latch 60. It will be appreciated that because of the serial nature of the signal processing, the illustrated state operations are not being performed on the same pixel data. For example, during a given pixel processing twenty state period, the enabled state signal PCR+PCE results in the transfer of pixel signal "n" out of CCD 10. In turn, state signal GOL latches gain/offset data for pixel "n" which state signals RH and VH are currently sampling. State signal ADC causes A/D converter 30 to convert the previously sampled/compensated signal for pixel "n−1" and the enabled state signal FWR+FWE writes previously converted pixel data for pixel "n−1" into FIFO memory 45.

Having described the general structure and operation of the CCD signal processing circuit, there will now be described the apparatus for controlling the operation of the linear CCD 10 in accordance with the invention. Means for supplying a bit map of control words to be used in controlling the operation of CCD 10 includes microprocessor 100 and buffer 53. The control words each comprise programmably variable bit content defining pixel-by-pixel operating characteristics of the CCD 10. The architecture of a 6-bit control word is set forth in Table I which summarizes the functions of the bits within the control word. As will be seen, for a CCD having a line of 530 imaging pixels, a bit map of 530 of these control words is used to control the operation of the CCD for one entire scan line of the CCD.

TABLE I

| Bit | Name | Function |
| --- | --- | --- |
| 0 | LP | Last Pixel - Reset pixel counter 50 when the last state signal LS is provided by state decoder |
| 1 | FWE | FIFO Write Enable - Allow FIFO write raw signal FWR from state decoder 55 to write data from A/D converter 30 into FIFO memory 45 |
| 2 | PCE | Phase Clock Enable - Allow phase clock raw signal PCR from state decoder 55 to be sent to linear imager 10 |
| 3 | TG | Transfer Gate - Transfer charge from the light detecting sites to the charge shifting structure of linear imager 10 |
| 4 | EE | Exposure End - End the exposure cycle in linear imager 10 |
| 5 | ES | Exposure Start - Start the exposure cycle in linear imager 10 |

The apparatus of the invention further includes memory means, including memory 52 for storing the bit map of control words at memory addresses corresponding to individual imaging pixels in CCD 10. Address means, including pixel counter 50, is provided for supplying a sequence of pixel counts corresponding to the individual imaging pixels in the CCD for use in accessing the stored bit map of control words on a pixel-by-pixel basis. To provide microprocessor 100 access to the memory 52, the pixel counter 50 is disabled from counting and an address is loaded directly into pixel counter 50 by microprocessor 100; then buffer 53 is enabled so that the microprocessor 100 can write data to memory 52 at the memory location specified by the address previously loaded into pixel counter 50. To provide for multiple bit maps, two of the most significant bits (MSB) of the address data are provided from the microprocessor 100 to state decoder 55 via map latch 56 and latch 57 for use in selecting from within memory 52 the control word bit map to be used in controlling the operation of the CCD during generation of the next line of signal data in CCD 10. It is noted that the "last state" bit (LS) of the state control signal from state decoder 55 is used to advance the count of the pixel counter 50 and the combination of a "last pixel" (LP) signal from latch 60 with the "last state" signal (LS) is used to clear the pixel counter and latch the MSB address data for the bit map to be used in pixel-by-pixel control of the next line of signal data generation in CCD 10.

Control word data latch 60 in conjunction with the control word latch (CWL) state signal from state decoder 55 comprises means operating in sequence with the pixel counter 50 for outputting the control words from the memory 52 to the imaging CCD 10 on a pixel-by-pixel basis to control the operation of the imaging device in accordance with the bit content of each control word.

Considering now the operation of the apparatus of the invention, a control word latch 60 receives a map of operating control words from memory 52 which are outputted on a pixel-by-pixel basis to the imager 10 to control the operation of the imager 10 in accordance with the bit content of each control word. The control words in each map, which are supplied by microprocessor 100 via buffer 53, each comprise programmably variable bit content defining pixel-by-pixel operating characteristics of the imager 10. The map of control words is stored in memory 52 at memory addresses corresponding to the pixel counts provided by pixel counter 50. Multiple maps of control words may be stored in memory 52. Appropriate map location address information is provided by two bit address code from microprocessor 100 stored in map latch 56. At the end of each processed line of pixel data from the CCD 10, the map address code in latch 56 is latched into latch 57 to provide two of the most significant bit MSB map address information via state decoder 55 to memory 52 which serves to select the control word map for use in the next line of imager processing. It may be noted that the state decoder 55 may provide alternative MSB map address information during certain states of each pixel in order to provide access to a table of gain/offset data values stored in memory 52. The output of pixel counter 50 provides the least significant bits LSB in the address information which serves to address the individual control words on a pixel-by-pixel basis for transfer to control word latch 60.

Table II, below, presents an example control word map based on the bit functions from Table I. In the timing of state decoder outputs as shown in FIG. 2, the control word is latched by state control signal (CWL) at the end of each pixel time; hence, the control word for a given pixel count actually takes effect during the next pixel. Additionally, since the signal for a given pixel is actually A/D converted during the next pixel time, writing the given pixel's data to the FIFO memory should take place after conversion is complete in the next pixel as previously explained. Noting these latencies and pipeline effects, a description of the example control word map can be provided.

TABLE II

| Pixel Counter | Control Word Bits 543210 | Pixel Type | Line Events |
|---|---|---|---|
| 0 | 000100 | Test & dummy | exposure start, phase clock enabled |
| 1 | 000100 | Test & dummy | |
| 2 | 000100 | Test & dummy | |
| ... | ... | ... | ... |
| 9 | 000100 | Test & dummy | |
| 10 | 000110 | Imaging | |
| 11 | 000110 | Imaging | write ti FIFO |
| ... | ... | Imaging | ... |
| 123 | 000110 | Imaging | |
| 124 | 010110 | Imaging | |
| 125 | 000110 | Imaging | exposure end |

TABLE II-continued

| Pixel Counter | Control Word Bits 543210 | Pixel Type | Line Events |
|---|---|---|---|
| ... | ... | ... | ... |
| 248 | 000110 | Imaging | |
| 249 | 100110 | Imaging | |
| 250 | 000110 | Imaging | exposure start |
| ... | ... | Imaging | ... |
| 373 | 000110 | Imaging | |
| 374 | 010110 | Imaging | |
| 375 | 000110 | Imaging | exposure end |
| ... | ... | ... | ... |
| 488 | 000110 | Imaging | |
| 489 | 000110 | Imaging | |
| 490 | 000100 | Test & dummy | |
| 491 | 000100 | Test & dummy | write to FIFO disabled |
| ... | ... | ... | ... |
| 498 | 000100 | Test & dummy | |
| 499 | 000000 | Test & dummy | |
| 500 | 001000 | Test & dummy | phase clock disabled |
| 501 | 001000 | Test & dummy | transfer charge to shifting structure |
| 502 | 000001 | Test & dummy | |
| 503 | 100100 | Test & dummy | transfer charge to shifting structure disabled, reset pixel counter |

In the example control word map in Table II, the first ten pixels (pixel counts from 0 to 9) of the linear imager are test or dummy pixels. The phase clock is enabled by the PCE bit in bit position 2 of the control word applied via AND circuit 61 in order to shift the signal from these test and dummy pixels out of the linear imager. Note that the PCE bit which affects the pixel for pixel count 0 is actually set in the last control word in the map (pixel counter=503). The next 480 pixels (pixel counts from 10 to 489) are actual imaging pixels. The phase clock is still enabled by the PCE bit in bit position 2 of the control words to shift the signal from these actual pixels out of the imager. Additionally, the signal is converted and written to the FIFO memory for these pixels. Hence, the control word for pixels counts from 10 to 489 has the FWE bit in bit position 1 set so that writes to the FIFO memory will take place during pixel counts 11 through 490 after A/D conversion takes place. After the imaging pixels come another ten test or dummy pixels; and the phase clock continues to be enabled for pixel counts 490 through 499. The control words for pixel counts 499 through 502 has the FWE bit cleared so that the phase clock is disabled for pixel counts 500 through 503. The TG bit in bit position 3 is set in the control word for pixel counts 500 and 501 so that the accumulated charges in the light detecting sites can be transferred to the charge shifting structure during pixel counts 501 and 502. Pixel 502 has the LP signal in bit position 0 set so that the pixel counter will be reset to zero at the end of pixel count 503. Hence, at the end of pixel count 503, the readout of the control map continues at pixel count 0 of the next ensuing control word.

The exposure signal for the imaging pixels may be turned on at any time except when charge is being transferred from the imaging pixels to the charge shifting structure in the CCD. In the example control word map in Table II, the exposure for the next scan line begins with pixel count 0 by setting the ES bit in bit position 5 of pixel count 503 from the last control word in the bit map for the previous scan line. The control word for pixel count 124 has the EE bit set at bit position 5 in order to stop the exposure at the beginning of pixel count 125. The control word at pixel count 249 has the ES bit set at bit position 4 in order to begin another exposure cycle at the beginning of pixel count 250; the control word at pixel count 374 has the EE bit set in order to stop the exposure at the beginning of pixel count 375. Hence, there are two complete exposure cycles controlled by this map; exposure is actually turned on during 50 percent of each exposure cycle.

In FIG. 1, the actual exposure signal to the linear CCD imager 10 is provided by D-type flip flop 66 which is controlled by AND circuit 67 and OR circuit 68. Table III is a truth table showing the operation of AND circuit 67 and OR circuit 68. It is evident from the truth table that D-type flip flop 66 will retain its current state unless commanded to become a logic 1 by the exposure start signal ES or commanded to become a logical zero by the exposure end signal EE; additionally, it is evident that the exposure end signal EE takes precedence over the exposure start signal ES if both are logical 1. Following is a detailed description of the operation of D-type flip flop 66, AND circuit 67, and OR circuit 68.

TABLE III

| Exposure End Signal EE | Exposure Start Signal ES | D-Type Flip Flop Output O | D-Type Flip Flop Input D | Exposure Function |
|---|---|---|---|---|
| 0 | 0 | 0 | 0 | not exposing |
| 0 | 0 | 1 | 1 | exposing |
| 0 | 1 | X | 1 | start exposure |
| 1 | X | X | 0 | stop exposure |

X = Don't Care

Note that the exposure signal could be controlled directly by a single bit from the control word (in much the same way the TG signal works). However, if this arrangement were used in the control word bit assignments of Table I and the example control word map of Table II, then, in order to change the exposure from 50 percent to 25 percent, the single exposure bit would have to be cleared in 125 control words. By using two bits, one to start exposure (ES) and one to stop exposure (EE), changing exposure is greatly simplified. In order to change exposure using this scheme requires clearing the EE bit and setting a different EE bit for each exposure cycle. Hence, only 4 control words would be required to be changed in this example control word map which has two exposure cycles.

Note also that the total duration of the line, the number of test and dummy pixels, the number of imaging pixels, and the number of exposure cycles can be changed very simply in this scheme. It may be desirable, for example, to extend the total duration of a line in order to allow additional time for exposure (i.e., accumulation of charge in the light detecting sites). This can be accomplished very simply by adding more control words during the test and dummy pixels following the imaging pixels and by adjusting the exposure cycles to cover this longer line duration. Since writes to the FIFO memory are suppressed during this additional time, the rest of the system is unaffected by the longer line duration.

In the preferred embodiment shown in FIG. 1, there is a map latch 56 to which the microprocessor 100 can write two bits. These two bits are subsequently latched by latch 57 at the end of a line and provided to the state decoder 55 for incorporation into the MSB's sent to the memory 52 which contains the control word map. This allows the microprocessor to select from among a plurality of different control word maps in the memory 52. The number of available bit maps is determined by the size of the memory. The latch 7 is updated at the end of the line so that transition from one control word map to another occurs at a known point in the control word map, namely at a pixel count of 0. This ability to change control word maps "on the fly" without significant additional circuit complexity provides significant benefits. It may be desired, for example, to write data from every other pixel into the FIFO memory during some modes of operation and to write data from all pixels during other modes of operation. Or it may be desired to be able to quickly change exposure from one preset value to another without stopping the signal processing operation in order to write new exposure control bits into the memory 52. Or it may be desired to switch from a map where pixel data is written to the FIFO memory (an active mode) to a map where no pixel data is written to the FIFO memory (an idle mode). The map latch 56 and latch 57 permit the operation of these useful features.

The memory containing the control words may be an erasable programmable read only memory (EPROM) which could be removed and reprogrammed to allow different arrangements of control bits, or the memory could be a read/write memory so that the control bits could be changed in the system. This latter arrangement would be preferable if the control bits were being used for exposure control as it would allow the exposure to be changed in real time.

The control structures which generate the signals to the imager are greatly simplified in this scheme. As an example, each exposure signal in a previous PLD control device required eight logic cells for a counter, eight logic cells for a reload register, and a logic cell for the control output in addition to several logic cells controlling when to reload the counter based on the pixel count. In the arrangement of the invention, a single logic cell provides the exposure control to the CCD; it is set by the start exposure bit and cleared by the stop exposure bit in the control word. Hence, a minimum of sixteen logic cells per exposure signal are eliminated. With the previous PLD control device, the number of exposure cycles per line and the total duration of the line were fixed; with this control scheme, both things are easily changed by the placement of the bits controlling exposure and reset of the counter.

The invention has been described with reference to a preferred embodiment. However, it will be appreciated that variations and modifications can be effected by a person of ordinary skill in the art without departing from the scope of the invention.

PARTS LIST
10 linear CCD imager
11 amplifier
20 reference sample-and-hold
22 subtractor circuit
23 video sample-and-hold
25 multiplier circuit
26 gain D/A converter
27 adder circuit
28 offset D/A converter
29 gain/offset data latch
30 video signal A/D converter 45 FIFO memory
50 pixel counter
52 memory
53 buffer
54 state counter
55 state decoder
56 map latch
57 latch
58 clock
60 control word latch
61 AND circuit
62 AND circuit
65 AND circuit
66 D-type flip flop circuit
67 inverting AND circuit
68 OR circuit
100 microprocessor

What is claimed is:

1. Apparatus for controlling operation of a linear imaging device having a line of light-responsive imaging pixels, the apparatus comprising:

pixel counter means for supplying pixel counts corresponding to individual pixels in the imaging device;

means for supplying a map of operating control words, the control words each comprising programmably variable bit content defining pixel-by-pixel operating characteristics of said line of imaging pixels;

memory means for storing said map of control words at memory addresses corresponding to said pixel counts; and means for outputting said control words from said memory to said imaging device in synchronism with said pixel counts to control the operation of the imaging device on a pixel-by-pixel basis in accordance with the bit content of each control word.

2. The apparatus of claim 1 in which said means for supplying bit map control words supplies a plurality of maps of control words defining different operating characteristics of said imaging device for different lines of imaging and wherein there is included map address means for selecting one of said map of control words for an ensuing line of imaging operation.

3. Apparatus according to claim 1 wherein said map of control words includes a first bit controlling start of exposure of said imaging pixels and a second bit controlling end of exposure of said imaging pixels, whereby exposure cycle of a line of imaging pixels may be independently controlled as a function of map bit content.

4. A method of controlling operation of a linear imaging device comprising the steps of:

providing a map of operating control words each of which comprises programmably variable bit content defining pixel-by-pixel operating characteristics of a line of imaging pixels in the linear imaging device;

storing the control words in imaging pixel related address locations in a memory;

accessing said control words from the memory on a pixel-by-pixel basis; and using the accessed control words to control operation of the imaging device on a pixel-by-pixel basis.

5. The method of claim 4 wherein a plurality of different maps of control words are stored in the memory and the selected map of control words to control operation of a next ensuing line of imaging pixels is changed at the end of a current line of imaging pixels.

6. The method of claim 4 wherein the map of control words is supplied with a first bit position which initiates an imaging pixel exposure cycle and a second bit position which ends the imaging pixel exposure cycle.

* * * * *